US010339463B2

(12) United States Patent
Markert et al.

(10) Patent No.: US 10,339,463 B2
(45) Date of Patent: Jul. 2, 2019

(54) METHOD AND DEVICE FOR CREATING A FUNCTION MODEL FOR A CONTROL UNIT OF AN ENGINE SYSTEM

(71) Applicant: Robert Bosch GmbH, Stuttgart (DE)

(72) Inventors: Heiner Markert, Stuttgart (DE); Rene Diener, Ludwigsburg (DE); Ernst Kloppenburg, Ditzingen (DE); Felix Streichert, Edakita (JP); Michael Hanselmann, Korntal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1272 days.

(21) Appl. No.: 14/247,121

(22) Filed: Apr. 7, 2014

(65) Prior Publication Data
US 2014/0310210 A1 Oct. 16, 2014

(30) Foreign Application Priority Data

Apr. 10, 2013 (DE) .................. 10 2013 206 276

(51) Int. Cl.
*G06N 20/00* (2019.01)
(52) U.S. Cl.
CPC .................... *G06N 20/00* (2019.01)
(58) Field of Classification Search
None
See application file for complete search history.

(56) References Cited

U.S. PATENT DOCUMENTS

2008/0175482 A1* 7/2008 Ma .................. G06K 9/627
382/190

FOREIGN PATENT DOCUMENTS

DE 10 2010 028 259 10/2011
DE 10 2010 028 266 10/2011

OTHER PUBLICATIONS

James Bruce. "THe Bsics of Computer Programming 101—Variables and DataTypes" Oct. 23, 2011. [Online] DOwnloaded Jul. 11, 2017 http://www.makeuseof.com/tag/basics-of-computer-programming-variables-datatypes/.*
C. Plagemann, K. Kersting, W. Burgard, "Nonstationary Gaussian Process Regression Using Point Estimates of Local Smoothness," ICML Proceedings, pp. 204-2116, 2006.

* cited by examiner

*Primary Examiner* — Ben M Rifkin
(74) *Attorney, Agent, or Firm* — Norton Rose Fulbright US LLP; Gerard Messina

(57) ABSTRACT

A computerized method for creating a function model based on a non-parametric, data-based model, e.g., a Gaussian process model, includes: providing training data including measuring points having one or multiple input variables, the measuring points each being assigned an output value of an output variable; providing a basic function; modifying the training data with the aid of difference formation between the function values of the basic function and the output values at the measuring points of the training data; creating the data-based model based on the modified training data; and providing the function model as a function of the data-based model and the basic function.

20 Claims, 2 Drawing Sheets

METHOD AND DEVICE FOR CREATING A FUNCTION MODEL FOR A CONTROL UNIT OF AN ENGINE SYSTEM

BACKGROUND OF THE INVENTION

1. Field of the Invention

The present invention relates to a method and devices for creating function models for control units, in particular for engine systems in motor vehicles.

2. Description of the Related Art

In order to create a function model for emulating route and system functions in a control unit for an engine system, a task for an application engineer is in particular to make available reliable function values, which correspond to the predefined requirements or to probable courses, for input variables outside of the measured value range.

In order to implement function models, data-based, non-parametric models, such as Gaussian process models, may be provided which may be used to display complex relationships. However, Gaussian process models, in particular, have the disadvantage that their function values outside of the value range of input variables, which are supported by training data, have the tendency toward a predefined mean-value function, e.g., constant zero. Under certain circumstances, this may contradict the empirical values of the application engineer who, for example, presumes a certain course of the function values in a value range outside of the measuring points of the training data and would like to have this course to be taken into account in the function model.

BRIEF SUMMARY OF THE INVENTION

According to the present invention, a method for creating a function model based on a non-parametric, data-based model, as well as a corresponding device and a computer program are provided.

According to a first aspect, a method for creating a function model based on a non-parametric, data-based model is provided which includes the following steps:
providing training data including measuring points having one or multiple input variables, the measuring points each being assigned an output value of an output variable;
providing a basic function;
modifying the training data with the aid of difference formation between the function values of the basic function and the output values at the measuring points of the training data;
creating the data-based model based on the modified training data; and
providing the function model as a function of the data-based model and the basic function.

One purpose of the above-described method for creating a function model based on a non-parametric, data-based model is to provide an application engineer with the possibility to also control the function values of a non-parametric, data-based model outside of the value range in which the measuring points of the training data are located. By predefining the basic function, it may be achieved, for example, that the function model converges in the extrapolation range against the predefined basic function. Furthermore, it may be necessary to incorporate users' knowledge directly into the function model, if, for example, it is not possible to completely measure the relevant value range of the input variables.

In contrast to modeling of function models with the aid of characteristic maps and characteristic curves, it is difficult to influence the model behavior in the case of modeling non-parametric function models by manipulating the parameters suitably or intuitively. Previously known manipulations in particular include adding more measuring points to the function model and retraining the function model based on the expanded training data. In particular, if the added measuring points are close to the already present measuring points, the added measuring points may, however, have only little weighting power so that they cannot have an essential influence on the model behavior. If the added measuring points are not located in the original measuring range, they have an influence on the model behavior, but it is not possible to thereby define the extrapolation behavior in a satisfactory manner. Furthermore, adding measuring points results in a larger covariance matrix.

A constant mean value function, in particular of constant zero, which corresponds to the mean value of the function values of the function model is assumed as standard in Gaussian process models. For this reason, the function values of the Gaussian process model go back to the mean value of the function values of the training data outside of the ranges of the measuring points of the training data, i.e., in the extrapolation range. This behavior is, however, not desired in some applications, in particular if, from the course of the function of the function model, a clear trend already emerges with regard to which it may be assumed that it also applies outside of the measured input variable space.

According to the method mentioned above, a basic function is predefined in this case which predefines the course in the extrapolation range of the training data. The training data are adjusted by subtracting the corresponding function value of the basic function from the function values at the measuring points and by carrying out a corresponding modeling of the data-based model based on the modified training data. The result of conflating the basic function with the data-based model which was created from the modified training data is the (approximately) desired model which is based on the original training data, the extrapolation range being predefined by the basic function. In this way, extrapolation ranges of data-based models may be defined in almost any desirable manner.

The method mentioned above therefore provides a possibility of reapplying data-based models as well as of better controlling the extrapolation range of such function models.

Alternatively or additionally, it is possible to define a validity range, thus making it possible to applicatively establish for each input variable in which range the function model was created and is thus valid. In particular, the validity range may be predefined, the function values being determined with the aid of the function model within the validity range and with the aid of the basic function or another predefined, in particular constant function, outside of the validity range.

Furthermore, the validity range may be ascertained as a bounding box from the training data, the bounding box defining an input variable space with axis-parallel edges and all measuring points of the training data being located within this space.

In particular, a bounding box may be ascertained from the training data for this purpose, the bounding box defining an input variable space with axis-parallel edges and all measuring points of the training data being located within this space, the function values being determined with the aid of the function model within the bounding box and with the aid of the basic function or another predefined function outside of the bounding box.

In particular, the basic function may be predefined as a linear or constant function and in particular as a parametric model, a non-parametric model, or a physical model.

According to one specific embodiment, the basic function may be predefined as a D-dimensional hyperplane or it may be defined by predefining target values at target value points, the basic function being defined by a number D+1 target values for a number of D input variables, the basic function corresponding to a mean value function which results from the multi-linear interpolation between the target variables.

It may be provided that the other predefined function corresponds to a constant function $f(x)=f(\min(x_{max}, \max(x_{min}, x)))$ for a measuring point x, the operators "max" and "min" being used dimensionally and vectors $x_{max}$ and $x_{min}$ including the upper and lower margins of the input variable space for each input variable.

According to another aspect, a device, in particular an arithmetic unit, for creating a function model based on a non-parametric, data-based model is provided, the device being designed to:
provide training data including measuring points having one or multiple input variables, the measuring points each being assigned an output value of an output variable;
provide a basic function;
modify the training data with the aid of difference formation between the function values of the basic function and the output values at the measuring points of the training data;
create the data-based model based on the modified training data; and
provide the function model as a function of the data-based model and the basic function.

Alternatively or additionally, it is possible that the device is designed to provide for determining the function values using a validity range, which is established applicatively for each input variable, with the aid of the function model within the validity range and with the aid of the basic function or another predefined, in particular constant function, outside of the validity range.

According to another aspect, a computer program is provided which is designed to carry out all steps of the method mentioned above.

DETAILED DESCRIPTION OF THE INVENTION

Figure 1:
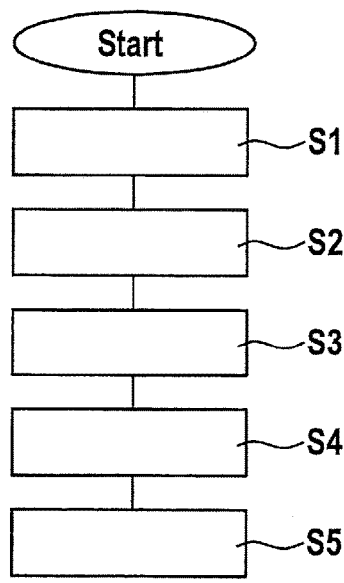
FIG. 1 shows a flow chart to illustrate the method for creating a function model based on a non-parametric, data-based model having defined extrapolation ranges.

The method for creating a function model based on a non-parametric, data-based model is described in the following in conjunction with the flow chart of FIG. 1.

In step S1, the starting point is providing measuring points of the training data together with the associated output values of an output variable. The measuring points may be ascertained by going through different operating points of a physical system to be measured, e.g., an engine system having an internal combustion engine. The corresponding output values of the resulting output variable are assigned to the measuring points.

Furthermore, in step S2, a basic function is defined which defines a function value course outside of the function value range described by the training data. This basic function may correspond to a linear, constant, or another type of function course. In particular, the basic function may predefine constant courses outside of the function value range described by the training data. The basic function may be predefined by a user, e.g., an application engineer. For example, the basic function of a function may correspond to a linear interpolation through the training data or it may correspond to a predefined parametric, non-parametric, or physical model.

In a simple case of a basic function, it is assumed that the basic function is described by a simple linear correlation. In the case of D input dimensions, the basic function is a hyperplane which is represented by the following equation $$a_1 x_1 + a_2 x_2 + \ldots + a_D x_D = a_0$$

Figure 2:
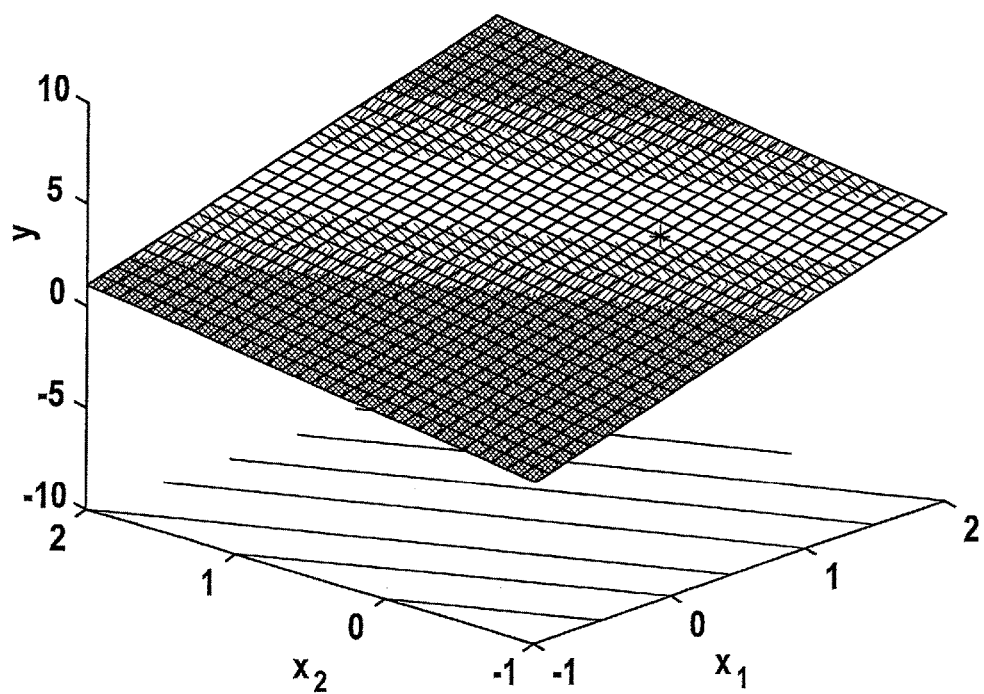
FIG. 2 shows a basic function for a function model having two input variables.

Parameters $a_0, a_1, a_2, \ldots, a_D$ of this function may be predefined directly or determined indirectly. In order to determine parameters $a_0, a_1, a_2, \ldots, a_D$ of this function, an application engineer initially specifies, for example, D+1 target values using which D+1 parameters of the planes of the plane equation mentioned above are computed by solving the associated linear system of equations. These target values may, for example, be indicated for D+1 end points of an axis-parallel bounding box (a space which includes all input values of the input variables) of the training data. The bounding box defines the valid value ranges of D input variables, which define an input variable space within which all measuring points of the training data are located. This is illustrated in FIG. 2, for example, on a case of two input variables.

In step S3, the application engineer may initially be asked for the setpoint values for all corner points of the axis-parallel bounding box around the input variable space to establish the procedure. In the case of D input dimensions, i.e., D input variables, $2^D$ target values must thus be specified. The basic function subsequently results from the multi-linear interpolation mentioned above between the target values. Alternatively, the hyperplane may also be adjusted to the measured data points.

Now, modified training data are generated in step S3 in the case of which the function values of the previously provided basic function at the corresponding measuring point are subtracted from the output values at the measuring points of the provided training data in order to obtain the output values of the training data which were modified at the measuring points.

In step S4, a non-parametric, data-based model, in particular a Gaussian process model, is created at the corresponding measuring points on the basis of the modified output values of the training data. The data-based model describes the deviations of the original output values from the previously predefined basic function.

The utilization of non-parametric, data-based function models is based on a Bayesian regression process. The Bayesian regression is a data-based process which is based on a model. To create the model, measuring points of training data as well as the associated output data of an output variable are needed. The model is created by using node data which correspond entirely or partially to the training data or which are generated therefrom. Furthermore, abstract hyperparameters are determined which parametrize the space of the model functions and effectively weigh the influence of the individual measuring points of the training data with regard to the later model prediction.

The abstract hyperparameters are determined with the aid of an optimization process. One option of such an optimization process is optimizing a marginal likelihood p(Y|H,X). Marginal likelihood p(Y|H,X) describes the plausibility of measured y values of the training data which are illustrated as vector Y with model parameters H and x values of the training data. During model training, p(Y|H,X) is maximized by searching for suitable hyperparameters with the aid of which data may be explained particularly well.

The optimization process automatically ensures in this case a trade-off between the model complexity and the display accuracy of the model. Although an arbitrarily high display accuracy of the training data may be achieved with increasing model complexity, this may, however, result at the same time in an overfitting of the model to the training data and thus in a worse generalization property.

By creating the non-parametric, data-based function model, the following is obtained:

$$v = \sum_{i=1}^{N}(Q_y)\sigma_f \exp\left(-\frac{1}{2}\sum_{d=1}^{D}\frac{((x_i)_d - u_d)}{l_d}\right),$$

wherein v corresponds to the model value at a testing point u, $x_i$ corresponds to a measuring point of the training data, N corresponds to the number of the measuring points of the training data, D corresponds to the dimension of the input data space/training data space, and $l_d$ and $\sigma_f$ correspond to the hyperparameters from the model training. $Q_y$ is a variable which was computed from the hyperparameters and the measuring data.

Conflating the basic function and the data-based model results in step S5 in the function model having the extrapolation range which is predefined by the basic function.

Figure 3:
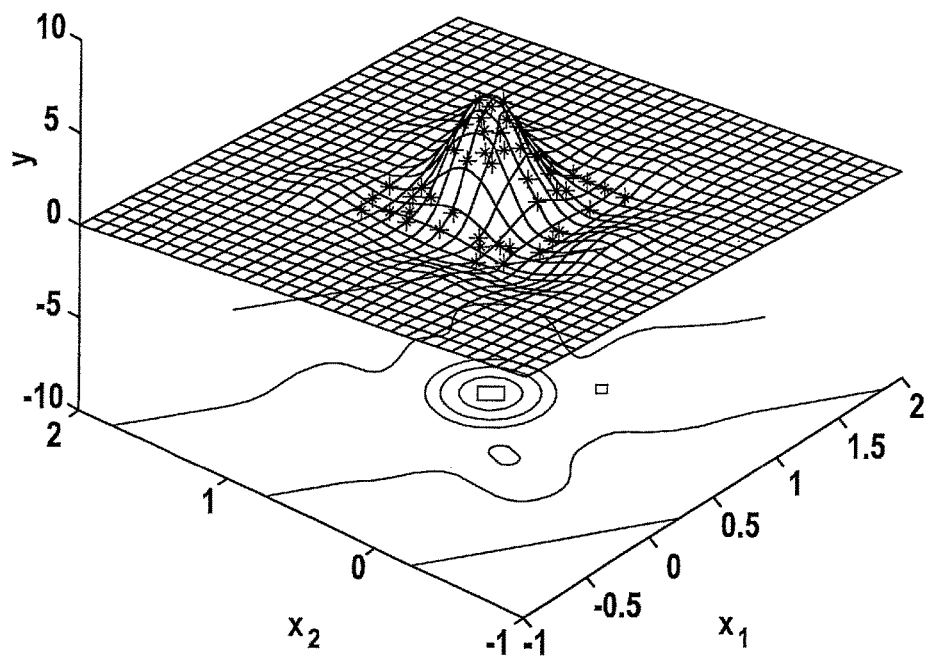
FIG. 3 shows an illustration of a data-based model which was created on the basis of modified training data.

FIG. 3 shows the function of the data-based model which was created according to the modified training data having two input variables. The entire function model to be displayed results from the combination, i.e., additive application, of the basic function (FIG. 2) and the function of the data-based model (FIG. 3).

Figure 4:
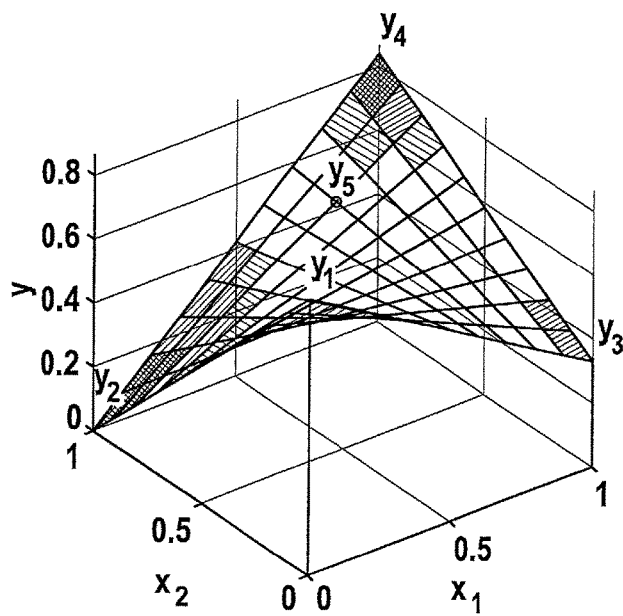
FIG. 4 shows an example of a basic function within a bounding box.

FIG. 4 shows an example of a basic function within a bounding box (described by the corner points [0,0], [1,0], [0,1], [1,1]) in which the application engineer has specified $2^2=4$ target values $y_1$, $y_2$, $y_3$, $y_4$ for the corner points. Naturally, other points, e.g., a point $y_5$, may also be used to determine the basic function within the bounding box. The pseudocode below indicates how the interpolation value may be obtained for arbitrary input dimensions D.
  % Input variables
  % corners: (2^D)×D matrix of the corner points of the user-specific (axis-parallel) bounding box; D corresponds to the number of dimensions
  % targets: (2^D)×1 vector of the user-specific target variables (at the 2^D edges)
  % point: 1×D vector, the testing point to be evaluated
  % output variables
  % val: interpolation value for the input value (scalar)
  Xmins=min(corners, [ ], 1); % 1×D vector having a minimum of the corners of the bounding box (one per dimension)
  Xmax=max(corners, [ ], 1); % 1×D vector having a maximum of the corners of the bounding box (one per dimension)
  lengths=xmaxs−xmins; % 1×D vector of the side length of the bounding box
  fractions=(point−xmins)/lengths; % 1×D vector of the weightings
  % position computation of the matrix of the size (2^D)×D
  positions (i,j)=1
  if corners (i,j)==xmins(j) and positions (i,j)=2 else positions=zeros(size(corners));
  for i=1: size(positions, 1)
  positions(i,:)=corners(i, :)==xmaxs;
  end
  positions=positions+1;
  % generate product for obtaining the weighting vector: if positions equals 1, (1-fraction) is used as weighting and if positions equals 2, "fraction" is used as weighting. The weighting factor is then multiplied by the target values. This is carried out for all edges of the bounding box and all dimensions
  val=0;
  % across all edges
  for c=1:C
  factors=1;
  % across all dimensions
  for d=1:D
  factors=factors*((positions(c, d)==1)*(1−fractions(d))+(positions(c, d)==2)*(fractions(d)));
  end
  val=val+factors*targets(c);
  end To ensure that the model is constantly continued starting from the margins of the validity range, whose margins may be predefined or described by an axis-parallel bounding box, for example, the model prediction of the data-based model may be adjusted as follows:

$$f(x)=f(\tilde{x})=f(\min(x_{max},\max(x_{min},x))).$$

Here, the operators max and min are to be used dimensionally, and D-dimensional vectors $x_{max}$ and $x_{min}$ contain for each dimension the upper/lower margins of the validity range. This means that if an input value is outside of the validity range of the model and therefore in the extrapolation range, that function value for the predicted measuring point is retrieved which is located directly on the margin between the model range and the extrapolation range. Where it holds:

$$\tilde{x}_d = \begin{cases} x_d, & x_{min,d} < x_d < x_{max,d} \\ x_{min,d}, & x_d < x_{min,d} \\ x_{max,d}, & x_d > x_{max,d} \end{cases}$$

This ensures a constant continuation of the Gaussian process model in the extrapolation range. At the margins between the model range and the extrapolation range, the function is typically not differentiable, jumps being avoided, however.

What is claimed is:

1. A method, performed via a processor, for generating a function model, for emulating route and system functions in a control unit for a combustion engine system, based on a non-parametric, data-based model, the method comprising:

providing training data including measuring points having at least one input variable, the measuring points each being assigned an output value of an output variable;

providing a basic function;

modifying the training data based on a difference between the function values of the basic function and the output values at the measuring points of the training data;

generating the data-based model based on the modified training data;

generating the function model as a function of the data-based model and the basic function; and providing the function model, for emulating the route and system functions in the control unit for the combustion engine system; and controlling the combustion engine system based on the function model;

wherein the training data improves the function model used by the processor, wherein the basic function is one of (i) predefined as a D-dimensional hyperplane, or (ii) defined by predefining target values at target value points, the basic function being defined by a number D+1 target values for a number of D input variables, and wherein the function model provides improved control of the combustion engine system, since the function model converges in an extrapolation range against a predefined basic function.

2. The method as recited in claim 1, wherein a validity range is predefined, the function values are also determined with the function model within the validity range and with one of the basic function or another predefined, constant function outside of the validity range.

3. The method as recited in claim 2, wherein the validity range is ascertained as a bounding box from the training data, the bounding box defining an input variable space with axis-parallel edges, and all measuring points of the training data being located within the bounding box.

4. The method as recited in claim 3, wherein the basic function is predefined as (i) one of a linear or constant function and (ii) one of a parametric model, a non-parametric model, or a physical model.

5. The method as recited in claim 3, wherein the basic function corresponds to a mean value function which results from a multi-linear interpolation between the target variables.

6. A method, performed via a processor, for generating a function model, for emulating route and system functions in a control unit for a combustion engine system, based on a non-parametric, data-based model, the method comprising:

providing training data including measuring points having at least one input variable, the measuring points each being assigned an output value of an output variable;

providing a basic function;

modifying the training data based on a difference between the function values of the basic function and the output values at the measuring points of the training data;

generating the data-based model based on the modified training data;

generating the function model as a function of the data-based model and the basic function;

providing the function model, for emulating the route and system functions in the control unit for the combustion engine system; and controlling the combustion engine system based on the function model;

wherein the training data improves the function model used by the processor, wherein a validity range is predefined, the function values being determined with the aid of the function model within the validity range, wherein the another predefined function corresponds to a constant function $f(x)=f(\min(x_{max}, \max(x_{min}, x)))$ for a measuring point x, the operators "max" and "min" being used dimensionally and the vectors $x_{max}$ and $x_{min}$ including the upper and lower margins of the input variable space for each input variable, and wherein the function model provides improved control of the combustion engine system, since the function model converges in an extrapolation range against a predefined basic function.

7. The method as recited in claim 6, wherein a validity range is predefined, the function values are also determined with the function model within the validity range and with one of the basic function or another predefined, constant function outside of the validity range.

8. The method as recited in claim 7, wherein the validity range is ascertained as a bounding box from the training data, the bounding box defining an input variable space with axis-parallel edges, and all measuring points of the training data being located within the bounding box.

9. The method as recited in claim 8, wherein the basic function is predefined as (i) one of a linear or constant function and (ii) one of a parametric model, a non-parametric model, or a physical model.

10. The method as recited in claim 8, wherein the basic function corresponds to a mean value function which results from a multi-linear interpolation between the target variables.

11. A computing device for generating a function model, for emulating route and system functions in a control unit for a combustion engine system, based on a non-parametric, data-based model, comprising:

a processor configured to perform the following:

provide training data including measuring points having at least one input variable, the measuring points each being assigned an output value of an output variable;

provide a basic function;

modify the training data based on a difference between the function values of the basic function and the output values at the measuring points of the training data;

generate the data-based model based on the modified training data;

generate the function model as a function of the data-based model and the basic function; and provide the function model, for emulating the route and system functions in the control unit for the combustion engine system; and control the combustion engine system based on the function model;

wherein the training data improves the function model used by the computing device, wherein the basic function is one of (i) predefined as a D-dimensional hyperplane, or (ii) defined by predefining target values at target value points, the basic function being defined by a number D+1 target values for a number of D input variables, and wherein the function model provides improved control of the combustion engine system, since the function model converges in an extrapolation range against a predefined basic function.

12. The computing device as recited in claim 11, wherein a validity range is predefined, the function values are also determined with-the function model within the validity range and with one of the basic function or another predefined, constant function outside of the validity range.

13. The computing device as recited in claim 12, wherein the validity range is ascertained as a bounding box from the training data, the bounding box defining an input variable space with axis-parallel edges, and all measuring points of the training data being located within the bounding box.

14. The computing device as recited in claim 13, wherein the basic function is predefined as (i) one of a linear or constant function and (ii) one of a parametric model, a non-parametric model, or a physical model.

15. The computing device as recited in claim 13, wherein the basic function corresponds to a mean value function which results from a multi-linear interpolation between the target variables.

16. A non-transitory, computer-readable data storage medium storing a computer program, which is executable by a processor, comprising:
   a program code arrangement having program code for generating a function model, for emulating route and system functions in a control unit for a combustion engine system, based on a non-parametric, data-based model, by performing the following:
   providing training data including measuring points having at least one input variable, the measuring points each being assigned an output value of an output variable;
   providing a basic function;
   modifying the training data based on a difference between the function values of the basic function and the output values at the measuring points of the training data;
   generating the data-based model based on the modified training data;
   generating the function model as a function of the data-based model and the basic function;
   providing the function model, for emulating the route and system functions in the control unit for the combustion engine system; and
   controlling the combustion engine system based on the function model;
   wherein the training data improves the function model used by the computing device,
   wherein the basic function is one of (i) predefined as a D-dimensional hyperplane, or (ii) defined by predefining target values at target value points, the basic function being defined by a number D+1 target values for a number of D input variables, and
   wherein the function model provides improved control of the combustion engine system, since the function model converges in an extrapolation range against a predefined basic function.

17. The data storage medium as recited in claim 16, wherein a validity range is predefined, the function values are also determined with-the function model within the validity range and with one of the basic function or another predefined, constant function outside of the validity range.

18. The data storage medium as recited in claim 17, wherein the validity range is ascertained as a bounding box from the training data, the bounding box defining an input variable space with axis-parallel edges, and all measuring points of the training data being located within the bounding box.

19. The data storage medium as recited in claim 18, wherein the basic function is predefined as (i) one of a linear or constant function and (ii) one of a parametric model, a non-parametric model, or a physical model.

20. The data storage medium as recited in claim 18, wherein the basic function corresponds to a mean value function which results from a multi-linear interpolation between the target variables.

* * * * *